United States Patent [19]
Taylor et al.

[11] Patent Number: 6,061,059
[45] Date of Patent: May 9, 2000

[54] PROVIDING A PREVIEW CAPABILITY TO A GRAPHICAL USER INTERFACE DIALOG

[75] Inventors: Thomas H. Taylor; David Earl Williamson, both of Redmond, Wash.

[73] Assignee: Adobe Systems Incorporated, San Jose, Calif.

[21] Appl. No.: 09/019,153

[22] Filed: Feb. 6, 1998

[51] Int. Cl.[7] ................................................ G06F 3/14
[52] U.S. Cl. .................... 345/339; 345/333; 345/334; 345/347; 395/704
[58] Field of Search .................... 345/335, 334, 345/333, 347, 339, 967, 966; 395/704, 702, 701

[56] References Cited

U.S. PATENT DOCUMENTS

| | | | |
|---|---|---|---|
| 5,119,476 | 6/1992 | Texier | 345/347 |
| 5,583,982 | 12/1996 | Matheny | 345/348 |
| 5,870,088 | 2/1999 | Washingon et al. | 345/326 |
| 5,903,269 | 5/1999 | Poreh et al. | 345/346 |

OTHER PUBLICATIONS

Borland C++, User Guide Ver.4.0, Borland International, Inc. pp.221–254, 1993.

Victo R. Volkmsn, The Dialog Editor controls pack, Windows–Dos developer's journal, v5,n10,p49(6) DialogLink file:275 01708926, 1994.

Ron Burk, World smallest dynamic dialog editor GUI programming, Windows–Dos develope's journal, v6,n9, p35(10) DialogLink file:275 01846351, 1995.

Primary Examiner—Raymond J. Bayerl
Assistant Examiner—Thomas T. Nguyen
Attorney, Agent, or Firm—Fish & Richardson P.C.

[57] ABSTRACT

Methods and computer programs for providing a preview capability to dialogs that include determining whether a dialog includes a preview control, and based on the determination processing dialog control commands to provide a preview capability. The methods and programs may use a dialog command manager if a dialog includes a preview control or a command manager if the dialog does not include a preview control.

29 Claims, 6 Drawing Sheets

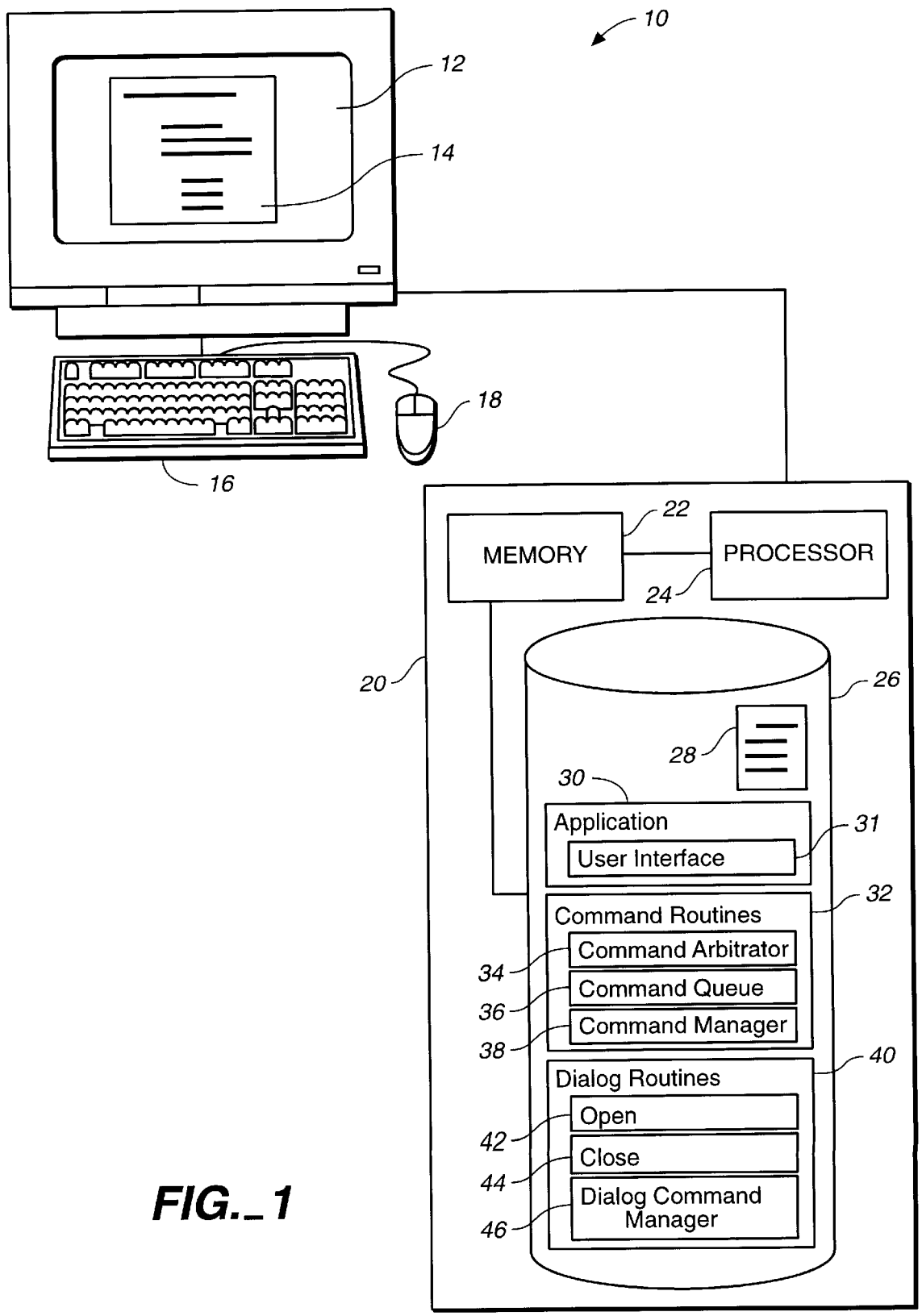
FIG._1

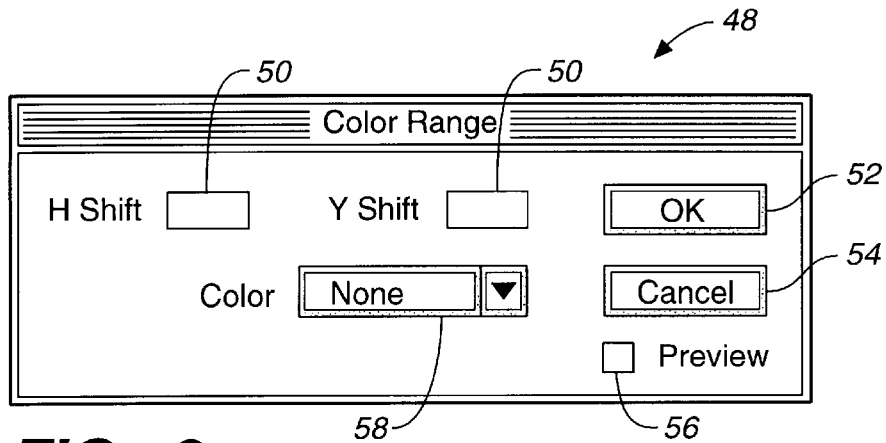
FIG._2
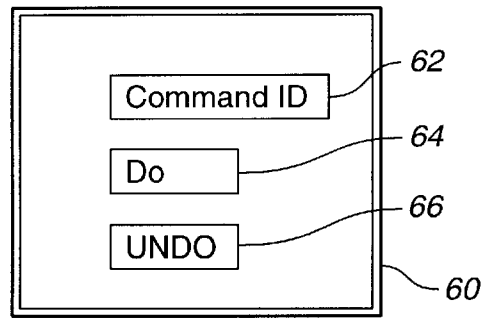
FIG._3
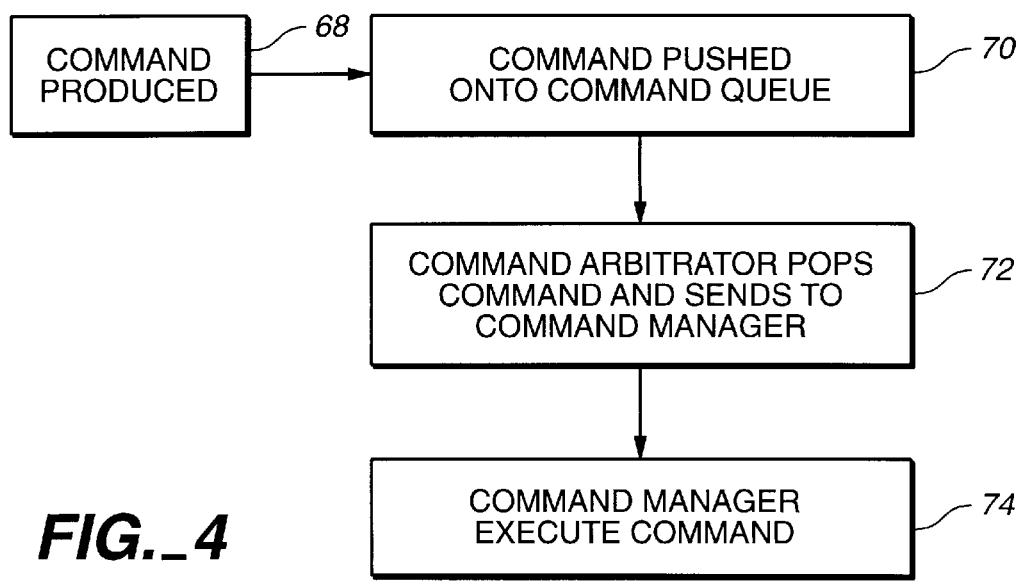
FIG._4

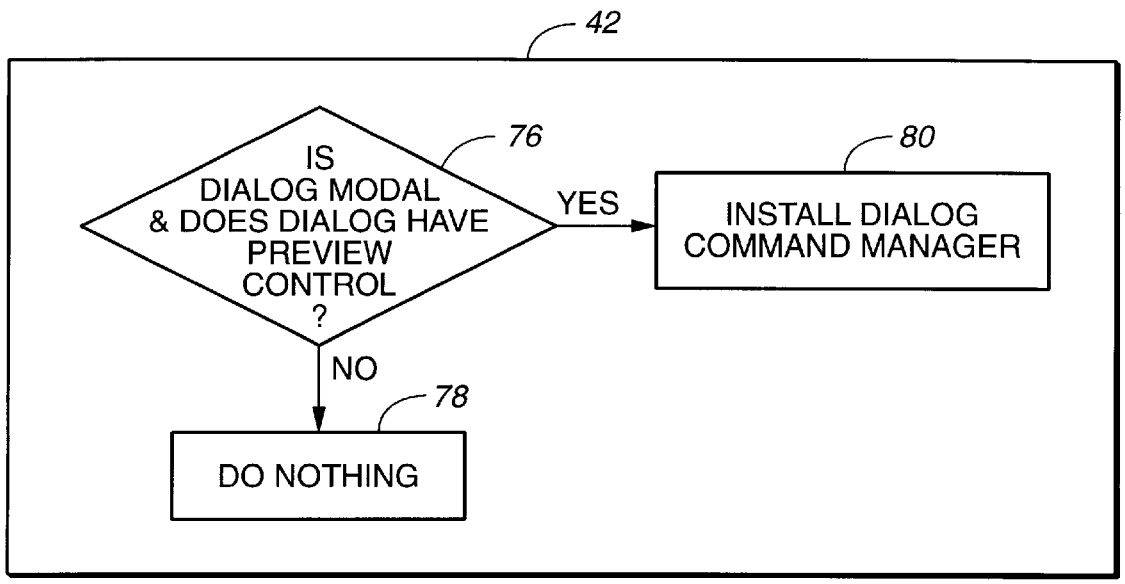
FIG._5
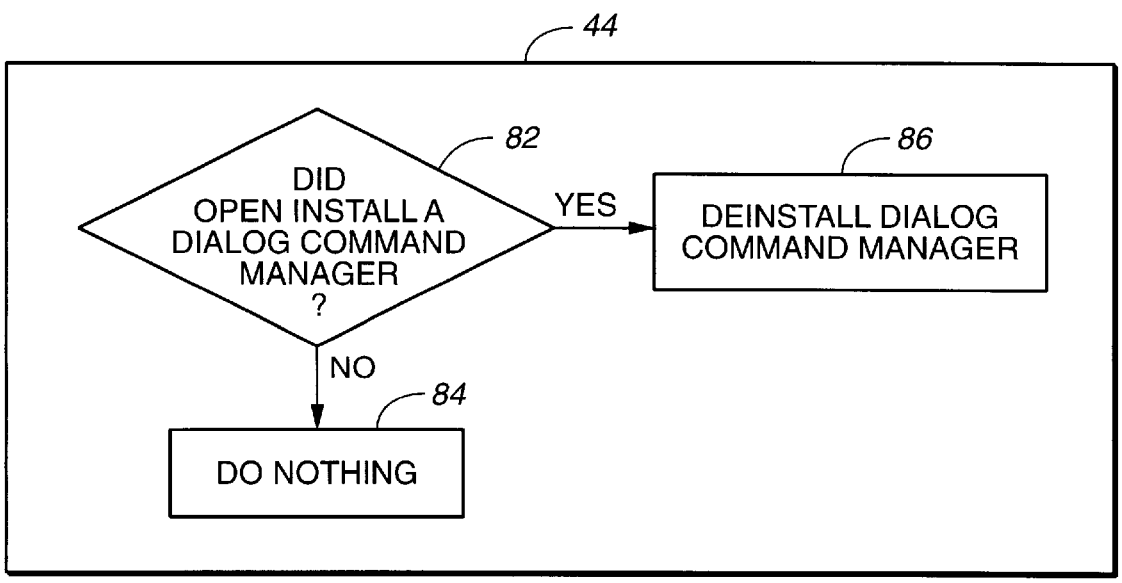
FIG._6

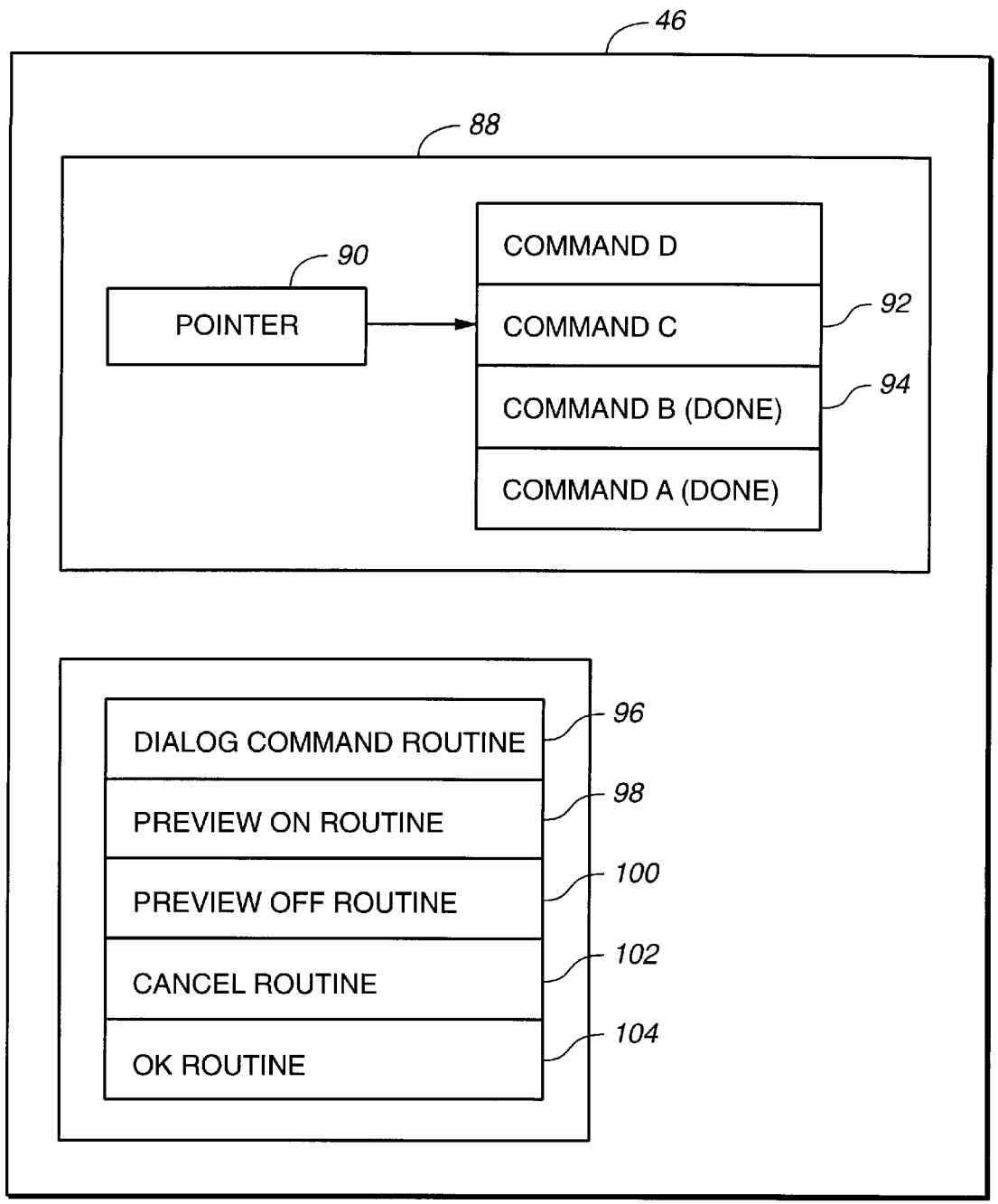
FIG._7

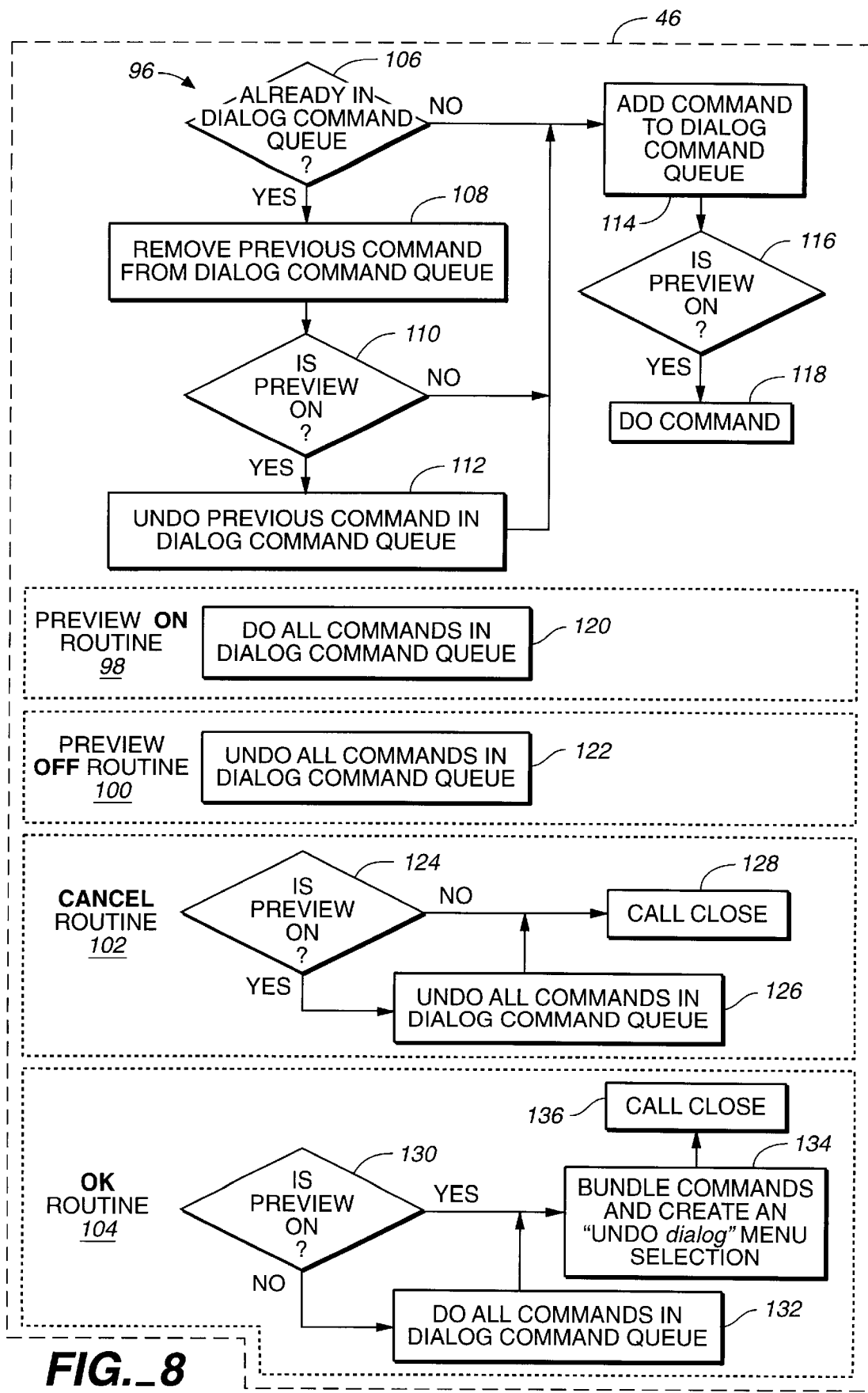
FIG._8

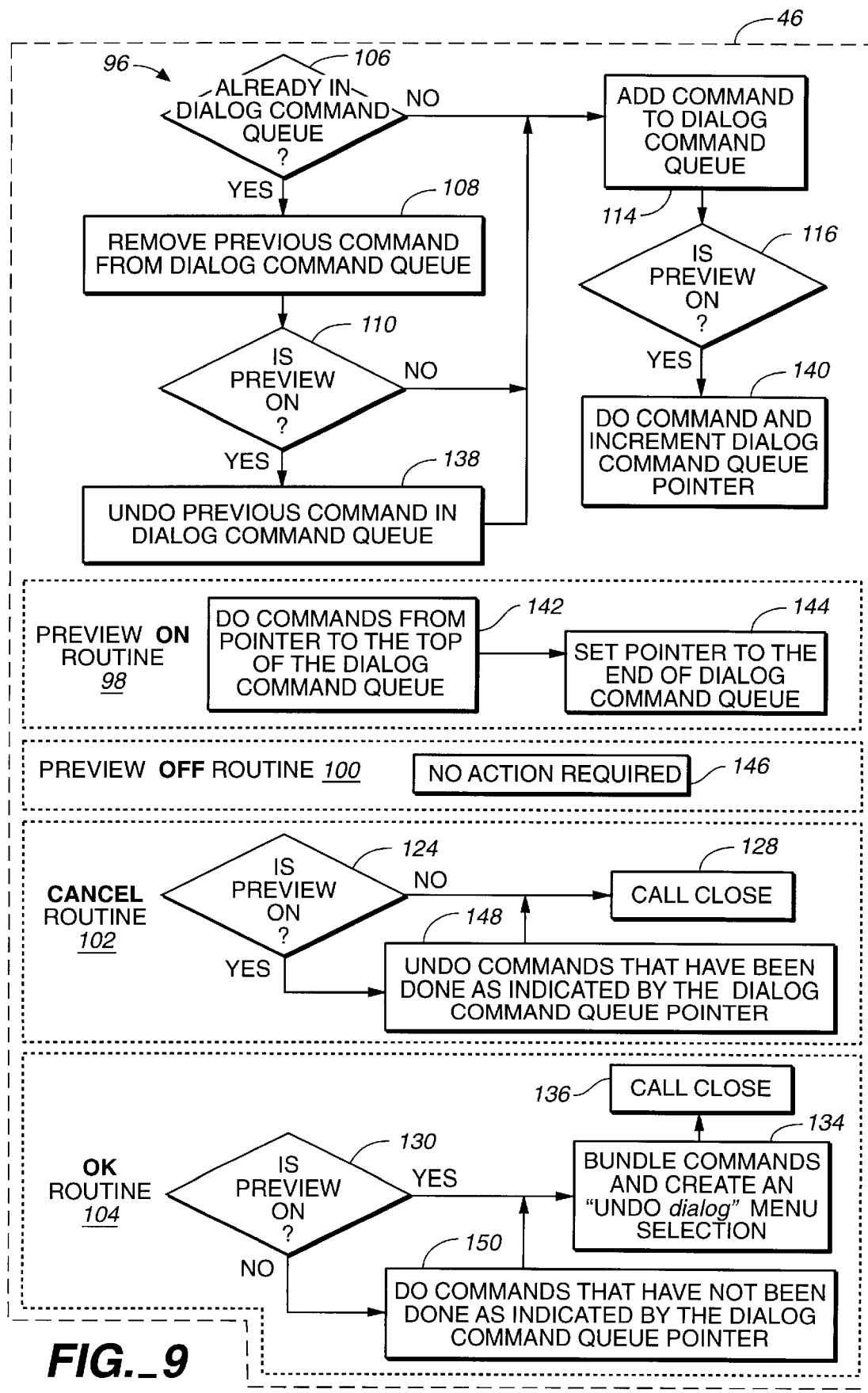
FIG._9

PROVIDING A PREVIEW CAPABILITY TO A GRAPHICAL USER INTERFACE DIALOG

BACKGROUND OF THE INVENTION

The invention relates to software user interfaces.

An application program graphic user interface (GUI) eases interaction between the application and a user. Programmers build an application GUI by assembling and tailoring prefabricated GUI controls (controls) found in libraries such as the Microsoft Foundation Class (MFC) library. Controls, such as buttons and scroll bars, implement predefined behaviors that a programmer can alter and supplement. A programmer can add a control to an application GUI through a visual development tool (e.g. Visual C++) or by entering instructions that call the control procedures.

A dialog panel control (dialog) produces an image of a box that includes other controls. Dialogs can be modal. A modal dialog prevents a user from interacting with application controls other than those associated with the dialog until the user closes the dialog.

Programmers can add dialogs to their user interface to display and receive data from conceptually related items. For example, a drawing application might display a dialog when a user wants more information about a drawn object. This dialog might display the drawn object's attributes such as the drawn object's color and size and allow the user to alter them.

Dialogs that include a preview control are known as previewable dialogs. A preview control, often a check box control labeled "preview," allows a user to see the effects dialog controls will have before closing the dialog. For example, a user might want to alter a drawn object's color through a dialog. By turning the dialog's preview control ON, the user can select different colors and see the object rendered in each color before settling on a particular color.

Developing previewable dialogs sometimes requires substantial programming effort. For example, some development environments require the programmer to write special procedures to support previewable dialogs.

SUMMARY

In general, in one aspect, the invention features a method of providing a preview capability to dialogs that includes determining whether a dialog includes a preview control, and based on the determination that the dialog includes a preview control, processing commands produced by the dialog's controls to provide a preview capability.

Implementations may include one or more of the following features. The method may process commands generated by dialog controls with a dialog command manager if it is determined that there is a preview control and by a command manager if there is no preview control. The method may place commands produced by the dialog's controls in a dialog command buffer, and do or undo the commands in accordance with the state or change of state of the dialog's controls. The method may determine whether a command to be placed in the dialog command buffer duplicates a command already in the dialog command buffer, and remove the duplicate commands. The method may bundle commands in the dialog command queue into a single macro command.

In general, in one aspect, the invention features a computer program product that provides a preview capability to a dialog by determining whether a dialog includes a preview control, process commands produced by a dialog having a preview control in a dialog command manager, and process commands produced by a dialog that does not have a preview control in a command manager.

In general, in one aspect, the invention features a software library routine that provides a preview capability for different dialogs by automatically buffering and manipulating commands produced by dialog controls.

Advantages may include one or more of the following. Providing a preview capability after determining a dialog includes a preview control allows developers to add and remove a preview capability to a dialog by simply adding and removing the preview control. The developer need not be aware of how the preview control is implemented. Additionally, the preview capability only requires that a dialog command supply execute and unexecute functions that the developer has typically already written. Therefore, a developer may not need to write special preview functions for each command.

Other features and advantages will become apparent from the following description including the drawings and the claims.

BRIEF DESCRIPTION OF THE DRAWINGS

FIG. 1 is a block diagram of a computer platform suitable for running an application having a graphical user interface.

FIG. 2 is an illustration of a dialog window.

FIG. 3 is a block diagram of a command.

FIG. 4 is a flowchart illustrating normal application command processing.

FIG. 5 is a flowchart illustrating how the dialog Open routine can alter normal application command processing.

FIG. 6 is a flowchart illustrating how the dialog Close routine can restore normal application command processing.

FIG. 7 is a block diagram of a Dialog Command Manager including routines, a Dialog Command Queue, and a Dialog Command Queue pointer.

FIG. 8 is a collection of flowcharts illustrating Dialog Command Manager routines that handle previewable dialog commands without using the Dialog Command Queue pointer.

FIG. 9 is a collection of flowcharts illustrating Dialog Command Manager routines that uses the Dialog Command Queue pointer.

DETAILED DESCRIPTION

Referring now to FIG. 1. A computer platform 10 includes a display 12, a keyboard 16, a mouse or other pointing device 18, and a digital computer 20. The digital computer 20 comprises memory 22, a processor 24, a mass storage device 26 (i.e. a hard disk drive, floppy disk drive, etc.), and other customary components such as a memory bus and peripheral bus (not shown).

The mass storage device 26 stores electronic signals representing an application 30 (e.g. a word processor) and an electronic document 28 comprising data signals representing text, sounds, images, etc. The application 30 and electronic document 28 are transferred to memory 22 and processor 24 in the course of operation.

The application 30 contains a user interface 31. The user interface 31 includes controls that display the electronic document 28 in human-perceptible form 14 on the display 12. The user interface 31 also handles other controls (e.g. buttons, check-boxes, and menus). The user can manipulate these controls via the keyboard 16 and mouse 18.

Many applications share common functions. These common functions can reside in Dynamic Link Libraries (DLLs) that different applications 30 can access when needed. These common functions include routines 32 that handle application commands (described below) such as a Command Manager 38, a Command Arbitrator 34, and routines that support a Command Queue 36. DLLs also contain instructions that implement common user interface controls. Dialog Routines 40 implement the dialog control. These routines 40 include an Open 42 routine, a Dialog Command Manager 46, and a Close 44 routine.

Referring now to FIG. 2, a dialog 48 can include a Text control 50 that allows the user to enter text into boxes, a pull-down menu 58 that allows a user to choose from a list of values, an OK button 52, a Cancel button 54, and a preview control 56. A programmer builds this dialog by tailoring and adding the different controls to a dialog control. The programmer can quickly add and remove the preview control the same way the programmer adds and removes the other controls (e.g. dragging a control from a palette in a visual development environment). Thus, development of dialogs occurs independent of the dialog's preview capability. Additionally, the programmer need not be aware of how the preview control is implemented, that is, a programmer needs no knowledge of any of the dialog routines used to produce a previewable dialog.

Referring now to FIG. 3, generally, manipulation of a control, such as clicking on a button, produces a command 60. Commands 60 can affect the electronic document or the user interface itself. A command 60 includes a Command ID 62. A Command ID 62 is a number indicating the type of command. For example, a MoveCmd may have a Command ID of 1 while a RotateCmd has a Command ID of 2. The Command ID 62 need not be unique to each command, that is, a programmer could instruct both commands to share the same Command ID 62.

A command 60 encapsulates several different related routines. Most commands 60 provide a DO routine 64 and an UNDO routine 66. The UNDO routine is the opposite of the DO routine. Actions the DO routine 64 performs, the UNDO routine 66 reverses. For example, a "DO MoveCmd" command would move a drawn object on the screen while an "UNDO MoveCmd" would return the drawn object to its original position. Hence, an UNDO routine 66 allows users to "take back" unintended commands.

Referring now to FIG. 4, normal processing of commands begins when an application produces a command 68 perhaps in response to user manipulation of a control. The Command Queue stores 70 the command. The Command Arbitrator retrieves the command from the Command Queue and sends 72 the command to the Command Manager. The Command Manager executes the command 74 by calling one of the command's routines, for example, the command's DO routine.

Referring now to FIG. 5, a modal previewable dialog alters normal command processing. An application produces a dialog by calling the Open 42 routine. The Open 42 routine determines 76 whether the dialog being displayed is both modal and contains a preview control. If the dialog does not meet these criteria, command processing continues 78 as normal. If, however, the dialog is modal and has a preview control, the Open 42 routine installs 80 a Dialog Command Manager and notifies the Command Arbitrator that subsequent commands generated by the application should be sent to the Dialog Command Manager instead of the normal Command Manager.

Referring now to FIG. 6, the dialog Close routine 44 returns command processing to normal when the user is done with a modal previewable dialog. The Close 44 routine checks 82 to see if a Dialog Command Manager had been installed by the Open routine. If so, the Close 44 routine reinstalls 86 the Command Manager and notifies the Command Arbitrator to resume sending commands from the Command Queue to the regular Command Manager. If the Dialog Command Manager has not been installed 84, the processor does nothing and merely exists.

Referring now to FIG. 7, the Dialog Command Manager 46 includes a Dialog Command Queue 88, a Dialog Command routine 96, a Preview ON routine 98, a Preview OFF routine 100, a Cancel routine 102, and an OK routine 104. The Dialog Command Queue 88 stores commands produced by dialog controls. The Dialog Command routine 96 pushes commands received by the Dialog Command Manager 46 onto the top of the Dialog Command Queue 88. Some embodiments of the Dialog Command Manager 46 use a Dialog Command Queue pointer 90. The Dialog Command Queue pointer 90 indicates the earliest command in the Dialog Command Queue 88 that has not been executed. If all commands have been executed, the pointer rests at the top of the Dialog Command Queue 88.

Referring now to FIG. 8, one implementation of the Dialog Command Manager 46 includes routines that do not use the Dialog Command Queue pointer. In this embodiment, when the dialog's preview control is OFF, the electronic document is presented as it existed before the previewable dialog was opened. When the preview control is ON, the electronic document shows the effects of commands issued by the dialog's controls.

The Dialog Command routine 96 handles most commands issued by dialog controls. The routine 96 checks 106 to see if a newly received command has the same Command ID as a command already stored in the Dialog Command Queue. If so, the routine removes 108 the old command from the queue. This prevents repeated commands from having cumulative effects. For example, if a user clicks ten times on a button that moves an image five pixels, the steps outlined above result in the drawn object only being moved five pixels instead of fifty. After removing 108 any duplicate command from the Dialog Command Queue, if the preview control is ON 110, the routine must also UNDO the old command to remove its effects 112 from the electronic document.

Regardless of whether the new command was previously stored in the Dialog Command Queue, the routine 96 pushes 114 the new command onto the Dialog Command Queue. If the preview control is ON 116, the routine 74 also DOes 118 the command.

The preview ON routine 98 handles a command issued by the preview control when the user sets it to ON, for example, by checking a box. The preview ON routine 98 responds by DOing 120 every command in the Dialog Command Queue. This leaves the electronic document (or other target of the command) in a state reflecting all commands issued by dialog controls. For example, if the user rotated an image and added shading, the document would reflect both changes after the user set the preview control to ON.

The preview OFF routine 100 UNDOes 122 each command in the Dialog Command Queue. This returns the electronic document to the state that existed if the commands produced by dialog controls were never produced. Continuing the above example, the document would unshade the image and rotate it back to its original orientation.

The Cancel routine 102 handles a command produced when the user clicks a Cancel button. The Cancel routine 102 erases any effects dialog commands may have had. If the preview control is ON 124, erasing includes UNDOing 102 each Dialog Command Queue command (step 102). After ensuring no command issued by a dialog control is DOne, the routine calls the Close routine.

The OK routine 104 handles a command produced when a user clicks an OK button. This indicates the user wants the electronic document to reflect all commands issued by the dialog controls. If the preview control was ON 130, all commands were already DOne and the electronic document already reflects all of the dialog commands. If the preview control was OFF 130, the OK routine 104 DOes each Dialog Command Queue command 110. After ensuring the electronic document reflects all Dialog Command Queue commands, the routine bundles 134 Dialog Command Queue commands into a single macro command that can be REDOne or UNDOne. The OK routine 104 then produces 134 a menu selection in the application's menu of "UNDO [dialogname]" that enables the user to UNDO all the effects of the dialog by choosing the menu selection. The application can also produce a "REDO [dialogname]" command (not shown) that enables the user to DO each command in the bundle. The OK routine then calls the Close routine.

Referring now to FIG. 9, another embodiment of the Dialog Command Manager 46 uses the Dialog Command Queue pointer to keep track of which commands have been DOne. In this embodiment, setting the preview control ON causes the Dialog Command Manager to DO those commands issued while the preview control was OFF. This embodiment of the Dialog Command Manager 46 implements the same named routines as the embodiment discussed in regard to FIG. 8, but implements them differently.

The Dialog Command routine 96 still ensures each command in the Dialog Command Queue has a unique Command ID 106, 108, 110, 112, and 114. However, after determining that the preview control is ON step 116, the routine not only DOes the new command, but also sets the Dialog Command Queue pointer to the top of the Dialog Command Queue since every command has been DOne.

The preview ON routine 98, rather than Doing every command in the Dialog Command Queue, instead DOes each command from the pointer's current position to the top of the Dialog Command Queue. This leaves the Dialog Command Queue pointer at the top of the Dialog Command Queue.

The Cancel routine 124 does not need to UNDO every command in the Dialog Command Queue if the preview control is ON to ensure no command in the Dialog Command Queue has been DOne. Instead, the routine 124 need only UNDO 148 each command that has been DOne as indicated by the Dialog Command Queue pointer before calling the Close routine 128.

Similarly, the OK routine 104, need not DO every command in the Dialog Command Queue to ensure each command has been DOne. Instead the routine 104 need only DO every command from the Dialog Command Queue pointer's current position to the top of the Dialog Command Queue.

Importantly, both embodiments of the Dialog Command Manager described use only command DO or UNDO routines. Thus, a programmer need not write any special command routines to support previewability.

While the different implementations of the Dialog Command Manager discussed include different routines, both could be included in an application to allow the user to choose between the two.

Other embodiments are within the scope of the following claims.

What is claimed is:

1. A method of providing a preview capability to a dialog comprising determining whether a dialog having one or more controls includes a preview control that a user can operate to specify whether the effects of interaction with dialog controls are to be previewed as interaction with the controls occurs, and based on the determination that the dialog includes a preview control, processing interaction with the one or more dialog controls to provide a preview of the effects of the interaction as interactions with the dialog controls occur if the preview control specifies the effects of the interaction are to be previewed.

2. The method of claim 1 wherein processing interaction with dialog controls comprises processing commands produced by dialog controls.

3. The method of claim 2 wherein processing commands produced by the dialog's controls to provide a preview comprises processing commands with a dialog command manager if it is determined that there is a preview control and with a command manager if it is determined that there is no preview control.

4. The method of claim 3 wherein processing commands with a dialog command manager comprises placing commands produced by the dialog's controls in a dialog command buffer that stores the commands, and doing or undoing the commands in accordance with the state or change of state of the dialog's controls.

5. The method of claim 4 wherein doing a command comprises calling the command's do function.

6. The method of claim 4 wherein undoing commands comprises calling the command's undo function.

7. The method of claim 4 further comprising determining whether a command to be placed in the dialog command buffer duplicates a command already in the dialog command buffer.

8. The method of claim 7 further comprising after determining a command to be placed in the dialog command buffer duplicates a command already in the dialog command buffer, undoing the duplicate command already in the dialog command buffer if the command has been done.

9. The method of claim 4 wherein doing or undoing the commands in accordance with the state or change of state of dialog controls comprises doing a command being placed on the dialog command buffer if the dialog's preview control is on.

10. The method of claim 4 wherein doing or undoing the commands in accordance with the state or change of state of dialog controls comprises not doing a command being placed on the dialog command buffer if the dialog's preview control is off.

11. The method of claim 4 wherein doing or undoing the commands in accordance with the state or change of state of dialog controls comprises if the dialog's preview control's state changes from off to on, doing commands in the dialog command buffer that have not been done.

12. The method of claim 4 wherein doing or undoing the commands in accordance with the state or change of state of dialog controls comprises if the dialog's preview control's state changes from on to off, undoing commands in the dialog command buffer.

13. The method of claim 4 wherein doing or undoing the commands in accordance with the state or change of state of dialog controls comprises if a dialog control indicates that dialog commands should have effect after the dialog closes, doing when the dialog closes commands in the dialog command buffer that have not been done.

14. The method of claim 13 further comprising if the dialog's control that indicates that dialog commands should have effect after the dialog closes is selected, bundling commands in the dialog command buffer into a single macro command that can be done or undone.

15. The method of claim 14 further comprising after bundling commands into a single macro command, creating a selection in a menu that enables a user to undo the single macro command.

16. The method of claim 4 wherein doing or undoing the commands in accordance with the state or change of state of dialog controls comprises if a dialog control indicates that dialog commands should not have effect after the dialog closes, undoing when the dialog closes commands in the dialog command buffer.

17. A computer program product, residing on a computer readable medium, for providing a preview capability to a dialog comprising instructions for causing a computer to:

determine whether a dialog includes a preview control that a user can operate to specify whether the effects of interaction with dialog controls are to be previewed as interaction with the controls occurs;

process commands produced by a dialog having a preview control in a dialog command manager to provide a preview of the effects of interaction with dialog controls as the interactions with the dialog controls occur if the preview control specifies the effects of the interaction are to be previewed; and process commands produced by a dialog that does not have a preview control in a command manager.

18. The computer program product of claim 17 wherein the dialog command manager comprises instructions for causing the computer to place commands in a dialog command buffer.

19. The computer program product of claim 18 wherein the dialog command manager comprises instructions for causing the computer to do commands being placed on the dialog command buffer if the preview control is on.

20. The computer program product of claim 17 wherein the dialog command manager comprises instructions for causing the computer to do commands in the dialog command buffer if the preview control is changed from off to on.

21. The computer program product of claim 17 wherein the dialog command manager comprises instructions that cause the computer to undo commands in the dialog command buffer if the preview control is changed from on to off.

22. The computer program product of claim 17 wherein the dialog command manager comprises instructions that cause the computer to do when the dialog closes commands in the dialog command buffer if a dialog control indicates that dialog commands should have effect after the dialog closes.

23. The computer program product of claim 17 wherein the dialog command manager comprises instructions that cause the computer to produce a bundled macro command of the commands in the dialog command buffer.

24. The computer program product of claim 17 wherein the dialog manager comprises instructions that cause the computer to undo when the dialog closes commands in the dialog command buffer if a dialog control indicates that the dialog commands should not have effect after the dialog closes.

25. A set of one or more software library routines, stored on a computer readable medium, for providing a dialog preview capability, the one or more routines comprising instructions for causing a computer to automatically buffer and manipulate commands produced by dialog controls to provide the preview capability for different dialogs including a preview control.

26. The software library routine of claim 25 further comprising instructions for causing a computer to determine at run-time whether a dialog includes a preview control.

27. The software library routine of claim 25 further comprising instructions for causing a computer to manipulate commands by invoking the commands' do or undo functions.

28. The software library routine of claim 25 further comprising instructions for causing a computer to buffer commands produced by different dialogs in different buffers.

29. A software system, disposed on a computer readable medium, the system comprising:

a graphical dialog development environment that includes a set of one or more controls for user selection for addition to a dialog, at least one of the controls being a preview control that a user can operate to specify whether the effects of interaction with dialog controls are to be previewed as interaction with the controls occurs; and instructions for determining during runtime whether a dialog includes a preview control and processing interaction with dialog controls to provide a preview capability based on user interaction with the preview control.

* * * * *